Patented May 7, 1940

2,199,557

UNITED STATES PATENT OFFICE 2,199,557

MANUFACTURE OF PIGMENTED COATING COMPOSITIONS

William Charlton, Rowland Hill, Eric Everard Walker, and Roy Basil Waters, Manchester, England, assignors to Imperial Chemical Industries Limited, a corporation of Great Britain No Drawing. Application July 14, 1937, Serial No. 153,668. In Great Britain July 16, 1936

9 Claims. (Cl. 260—41)

This invention relates to the manufacture of improved pigmented coating compositions.

It is known to make lacquers of polymerised methacrylates and satisfactory clear films have been made but pigmented lacquer films made of polymerised methacrylate are not entirely satisfactory as the polymerised methacrylates hitherto used have a tendency to flocculate the pigments used. These pigmented films have a poor gloss probably due to this flocculation.

This invention has as an object to provide a method of manufacturing pigmented coating compositions without or with greatly diminished tendency to flocculation of the pigment. A further object is to provide a method of manufacturing pigmented coating compositions which give a coating with a good gloss. A still further object is to produce new pigmented coating compositions. Further objects will appear hereinafter.

These objects are accomplished by the following invention. We have found that interpolymerisation of methacrylic esters, or mixtures of methacrylic and acrylic esters, with small proportions of methacrylic or acrylic acid yields products having less tendency to flocculate finely dispersed pigments in the presence of lacquer and varnish media than polymerisation products derived from methacrylic esters alone, or from mixtures of methacrylic and acrylic esters.

Therefore according to the invention we manufacture improved, pigmented coating compositions by incorporating together a pigment or pigments with a product obtained by interpolymerising an ester of the formula

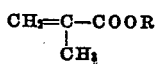

or a mixture of esters of the formula

with a small amount, for example ½% to 3% by weight, of an acid of the formula

R' being hydrogen or methyl and R being alkyl or cycloalkyl, and a lacquer or varnish solvent, together with, if desired, other film-forming and/or softening or plasticising agents. While it is preferred to add such amounts of methacrylic or acrylic acid as will constitute from ½% to 3% of the total weight of polymerisable materials, larger or smaller amounts may be used, though at the expense of one or more of those properties of the products which make them particularly useful as constituents of lacquers or varnishes.

For example, the addition of 5% of one of these acid constituents gives an interpolymer which has poor solubility in hydrocarbon solvents and yields solutions therein which have undesirably high viscosity characteristics. The flexibility and water resistance of the film are unduly diminished.

Similarly, although the use of less than ½% of the acid constituent may satisfactorily reduce the tendency of the polymer to cause flocculation of finely dispersed pigments in presence of lacquer or varnish media, it is only in favourable cases that a pigmented film prepared from such an interpolymer shows a satisfactorily improved gloss.

Incorporation may readily be brought about, for example, by dissolving the preformed interpolymerisation products in a lacquer or varnish solvent such as, for example, toluene, or a butyl acetate-xylene mixture and milling with the required pigment in a ball mill. Alternatively, the interpolymerisation reaction may be carried out in the particular solvent required, when it remains only to add and suitably disperse the pigment. As is well known, this method of carrying out the polymerisation in solution serves also to moderate the violence of the reaction and facilitates control of the degree of polymerisation of the product.

The invention is illustrated but not limited by the following examples in which the parts are by weight.

Example 1

40 parts of n-butyl methacrylate-methacrylic acid interpolymer were dissolved in 80 parts of toluene. The solution was milled in a ball mill with 20 parts of titanium dioxide until a uniformly pigmented composition was obtained. The resulting composition when applied to a clean metal surface gave a smooth film when air dried and after stoving for five to thirty minutes at temperatures ranging from 80° C. to 200° C. gave finishes having high gloss and good flexibility and adhesion.

The interpolymer used in the above example was made by heating 197 parts of n-butyl-methacrylate, 3 parts of methacrylic acid and 1 part benzoyl peroxide on a steam bath for 1 hour. The reaction mixture was then heated for a further 15 hours at 110° C. The resulting interpolymer was a colourless glass having a softening point of 127° C. acid value 9.93 and viscosity (as a 40% solution in toluene) of 16.1 poises at 20° C.

By using 20 parts of Brunswick Green in place of the titanium dioxide in Example 1 a green coating composition having similar excellent properties is obtained.

Example 2

When, instead of the n-butylmethacrylate-methacrylic acid interpolymer used in Example 1, an equal weight of an interpolymer of n-butyl methacrylate with acrylic acid was used, compositions possessing the same feature of high gloss were obtained.

The interpolymer was made in the same way as the methacrylic acid interpolymer described in Example 1, except that 198 parts of n-butylmethacrylate were used, and the methacrylic acid was replaced by 2 parts of acrylic acid.

Example 3

When the toluene used in the compositions described in Examples 1 and 2 was replaced by an equal weight of a mixture consisting of equal parts of butyl acetate and xylene, pigmented compositions with the same desirable characteristics were obtained, drying to glossy films which assumed a very high gloss on stoving, e. g., for 30 minutes at 180° C.

Example 4

1000 parts of a xylene solution containing 346 parts of a butyl methacrylate-methacrylic acid interpolymer were pigmented with 173 parts of titanium dioxide by grinding in a ball mill. A white composition was obtained which dried to films having a high gloss after stoving for 5 to 60 minutes at 180° C.

The resin solution used in the above example was prepared by dissolving 2376 parts of n-butyl methacrylate, 24 parts of methacrylic acid and 1 part of benzoyl peroxide in 1600 parts of xylene, and stirring and heating the solution to 90° C. under a reflux condenser. Polymerisation set in, accompanied by a slight rise of temperature. After heating for 1 hour at 90° C., the solution was heated for 16 hours at 105–115° C., cooled and diluted with 2000 parts of xylene. The solution so obtained had a viscosity of 18.7 poises at 20° C.

A 33.8% xylene solution of unmodified n-butyl methacrylate polymer was prepared in a similar manner, except that 2400 parts of n-butyl methacrylate were used and the methacrylic acid was omitted. The solution so obtained had a viscosity of 5.9 poises at 20° C. Pigmented films prepared from this solution by the method described above gave matt finishes under all conditions of stoving.

Example 5

When the titanium dioxide used in the composition described in Example 4 was replaced by
173 parts of a Brunswick Green, or
86.5 parts of Monolite Fast Scarlet RN (Colour Index No. 69), or,
86.5 parts of Bronze Scarlet 6323 (a barium lake pigment prepared from Lake Red C (Colour Index No. 165)),
green and scarlet finished, respectively, were obtained which, applied to a metal surface, air-dried and stoved for periods varying between five and thirty minutes at temperatures ranging from 80° C. to 180° C., gave coloured films of excellent gloss.

Example 6

100 parts of a xylene solution containing 40 parts of a butyl methacrylate-methacrylic acid interpolymer were pigmented as in Example 1 with 20 parts of titanium dioxide. The resulting composition applied to metal gave somewhat brittle finishes possessing a high gloss after stoving for one to twenty four hours at 100° C. to 180° C.

The interpolymer was made by stirring and heating a solution of n-butyl methacrylate (95 parts), methacrylic acid (5 parts) and benzoyl peroxide (1 part) in xylene (67 parts) for one hour at 90° C. under a reflux condenser and then continuing the heating at 105–115° C. for 16 hours.

Example 7

100 parts of a xylene solution containing 38.4 parts of a n-propyl methacrylate-methacrylic acid interpolymer were milled in a ball mill with 19.2 parts of titanium dioxide until a uniformly pigmented composition was obtained. When applied to a metal surface, the composition dried to a smooth white film with a semi-gloss, much enhanced by stoving, for example at 180° C. for 30 minutes.

The solution of interpolymer used in this example was made by dissolving 990 parts of n-propyl methacrylate, 10 parts of methacrylic acid and 2 parts of benzoyl peroxide in 1500 parts of xylene, and stirring and heating the solution so obtained under a reflux condenser at 90° C. for one hour, and then at 115° C. for 16 hours.

Example 8

When the titanium dioxide used in Example 7 was replaced by 19.2 parts of a Brunswick Green or by 9.6 parts of Monolite Fast Scarlet RN (Colour Index No. 69) or 9.6 parts of Bronze Scarlet 6323 (a barium lake pigment derived from Lake Red C (Colour Index No. 165), green and scarlet finishes with the same excellent gloss characteristics were obtained.

Example 9

1000 parts of a xylene solution containing 356 parts of an iso-propyl methacrylate-methacrylic acid interpolymer were milled in a ball-mill with 178 parts of titanium dioxide until a uniform dispersion was obtained. This composition, applied to a clean metal surface air-dried to films of good gloss, which on stoving, for example, at 180° C. for 30 minutes, assumed a high gloss.

The solution of interpolymer used in the above example was made by heating a mixture of 988 parts of iso-propyl methacrylate, 12 parts of methacrylic acid and 5 parts of benzoyl peroxide. When the temperature reached 80° C., polymerisation set in with evolution of heat, and the reaction was completed by heating the product at 105–115° C. for 15 hours. On cooling, a glassy solid was obtained which was dissolved in 1667 parts of xylene, giving a 35.6% solution of interpolymer having a viscosity of 9.8 poises at 20° C.

Example 10

40 parts of an interpolymer of iso-amyl methacrylate and methacrylic acid was dissolved in 60 parts of xylene and pigmented by milling in a ball-mill with 20 parts of titanium dioxide. Films formed from this composition on a metal surface air-dried to a smooth semi-gloss finish, and on stoving, for example, at 100° C. for one hour, assumed a high gloss.

The interpolymer used in the above example was made by heating a mixture of iso-amyl methacrylate (49.5 parts), methacrylic acid (0.5 part) and benzoyl peroxide (0.25 part) under a reflux condenser. When the temperature reached 90° C., polymerisation set in and was allowed to proceed without cooling, so that the temperature rose rapidly to 150° C., and then fell more slowly to 115° C. at which level it was maintained for 15 hours. The product was a colourless glassy resin.

Example 11

40 parts of a methyl acrylate-isopropyl methacrylate-methacrylic acid interpolymer were dissolved in 60 parts of xylene and milled in a ball-mill with 20 parts of titanium dioxide until a uniformly pigmented composition was obtained. When applied to a metal surface, the composition gave a semi-gloss finish when air-dried and a high gloss finish when stoved for a short time at temperatures from 80° C. to 180° C.

The interpolymer was made by heating isopropyl methacrylate (75 parts), methyl acrylate (25 parts), methacrylic acid (1 part) and benzoyl peroxide (0.5 part) to 90° C. under a reflux condenser. A vigorous exothermic reaction set in. When the initial reaction was over the product was heated at 105° C. for 16 hours, yielding a colourless glassy resin.

Example 12

A solution of 40 parts of cyclohexyl methacrylate-methacrylic acid interpolymer in 40 parts of toluene was pigmented by milling in a ball mill with 8 parts of titanium dioxide until a uniform composition was obtained. The resulting composition when applied to a metal surface air-dried in a few minutes to a smooth, semi-glossy film which after stoving for five to thirty minutes at temperatures ranging from 80°–180° C. gave finishes characterised by excellent colour and high gloss.

The interpolymer used in the above example was made by gently refluxing together for 16 hours 197 parts cyclohexyl methacrylate (obtained by interacting methyl methacrylate and cyclohexyl alcohol in benzene using sulphuric acid as esterification catalyst), 3 parts methacrylic acid and 2 parts benzoyl peroxide in 800 parts toluene. The reaction mixture was then steam distilled to remove toluene and other volatile constituents. The interpolymerisation product remained behind as a white frothy mass which was then dried at 110° C. for 16 hours to give a glassy solid of softening point 150° C. and a viscosity (as a 40% solution in toluene) of 1.91 poises at 20° C.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulphates for instance calcium sulphate, barium sulphate and the like), tinted titanium pigments, titanates such as barium, zinc, lead, magnesium titanates, and the like. Additionally, other types of inorganic pigments might be included, such as zinc sulphide pigments, for instance, zinc sulphide, lithapone, other extended zinc sulphide pigments, such as calcium base lithopone, zinc sulphide extended with natural extenders, and the like, zinc oxide and antimony oxide, or organic pigments, that is organic colouring matters which are devoid of sulphonic, carboxylic or other water-solubilising groups. Also for the purposes of this invention we include within the term "pigment" other water-insoluble organic colouring matters such as, for example, the calcium or barium lakes of azo lake dyestuffs.

Interpolymers suitable for use according to the invention may be prepared by the known methods which are customarily employed for the polymerisation of acrylic and/or methacrylic esters. For example, interpolymerisation may be effected by the application of heat, light and/or a polymerisation catalyst such as benzoyl peroxide and in the presence or absence of a solvent. Interpolymerisation may also be effected in aqueous emulsion. Whilst other film-forming properties of our improved pigmented compositions may vary according to the method by which the interpolymers employed have been prepared, the feature of enhanced gloss still remains characteristic.

This invention is a very valuable advance in the art, enabling one to make coloured coating compositions of polymerised methacrylates giving lacquers with a very fine gloss.

As many apparently widely different embodiments of this invention may be made without departing from the spirit and scope thereof, it is to be understood that we do not limit ourselves to the specific embodiments thereof except as defined in the appended claims.

We claim:

1. The process for the manufacture of improved non-flocculating pigmented coating compositions which comprises mixing a pigment, a solvent, an interpolymer of an ester of methacrylic acid and an acid of the formula $CH_2=CR'-COOH$ in which R' is selected from the group consisting of hydrogen and the methyl group.

2. Process of claim 1 in which the interpolymer is one of methyl methacrylate and ½ to 3% of methacrylic acid.

3. An improved non-flocculating pigmented coating composition having a high gloss comprising pigment an interpolymer of an ester of methacrylic acid and an acid having the formula $CH_2=CR'-COOH$ in which R' is selected from the group consisting of hydrogen and the methyl group.

4. Product of claim 3 in which the interpolymer is one of methyl methacrylate and ½ to 3% of methacrylic acid.

5. A non-flocculating pigmented coating composition comprising a non-flocculated titanium pigment in a vehicle comprising an interpolymer of an ester of methacrylic acid and an acid selected from the group consisting of acrylic acid and methacrylic acid.

6. Product of claim 5 in which the ester is an alkyl ester.

7. Product of claim 5 in which the ester is a cycloalkyl ester.

8. In the process of preparing non-flocculating pigment coating compositions which are applied to a metal surface and subsequently baked, the improvement of reducing the flocculating tendency of pigments which normally flocculate which comprises grinding a pigment in a solution of an interpolymer of methyl methacrylate and methacrylic acid until the pigment is suitably dispersed.

9. The composition of claim 3 in which the pigment is titanium dioxide.

WILLIAM CHARLTON.
ROWLAND HILL.
ERIC EVERARD WALKER.
ROY BASIL WATERS.